(12) United States Patent
Woltmann et al.

(10) Patent No.: US 8,011,188 B2
(45) Date of Patent: Sep. 6, 2011

(54) AUGMENTOR WITH TRAPPED VORTEX CAVITY PILOT

(75) Inventors: Ivan Elmer Woltmann, West Chester, OH (US); Sean Stacey Archer, Cincinnati, OH (US); Frank Gerald Bachman, Maineville, OH (US); Ralph Henry Winslow, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 1233 days.

(21) Appl. No.: 11/848,587

(22) Filed: Aug. 31, 2007

(65) Prior Publication Data

US 2009/0056340 A1   Mar. 5, 2009

(51) Int. Cl.
   *F02K 3/10*   (2006.01)
(52) U.S. Cl. ............................................. 60/766; 60/761
(58) Field of Classification Search ............ 60/761–766, 60/750
   See application file for complete search history.

(56) References Cited

U.S. PATENT DOCUMENTS

| | | | |
|---|---|---|---|
| 5,165,226 A * | 11/1992 | Newton et al. .................. | 60/804 |
| 5,619,855 A | 4/1997 | Burrus | |
| 6,286,298 B1 | 9/2001 | Burrus et al. | |
| 6,735,949 B1 * | 5/2004 | Haynes et al. .................. | 60/746 |
| 7,225,623 B2 | 6/2007 | Koshoffer | |
| 2002/0112482 A1 | 8/2002 | Johnson et al. | |
| 2005/0034458 A1 | 2/2005 | Burrus et al. | |
| 2005/0084812 A1 | 4/2005 | Rakhmailov et al. | |
| 2005/0262847 A1 | 12/2005 | Koshoffer | |
| 2006/0107667 A1 | 5/2006 | Haynes et al. | |
| 2007/0044476 A1 | 3/2007 | Koshoffer | |

FOREIGN PATENT DOCUMENTS

EP    1808644 A2    7/2007

OTHER PUBLICATIONS

G.J. Sturgess and K.Y. Hu, "Entrainment of mainstream flow in a trapped-vortex combustor", AIAA, Aerospace Sciences Meeting & Exhibit, 35th, Reno, NV, Jan. 6-9, 1997, 14 pages.

* cited by examiner

*Primary Examiner* — Louis Casaregola
*Assistant Examiner* — Andrew Nguyen
(74) *Attorney, Agent, or Firm* — William Scott Andes; Steven J. Rosen

(57) ABSTRACT

A gas turbine engine augmentor includes an annular trapped vortex cavity pilot having a cavity forward wall, a cavity radially outer wall, and a cavity aft wall, an annular cavity therebetween, and cavity fuel injector tubes operably disposed through the outer wall into the cavity. Circumferentially spaced apart radial flameholders with integral spraybars and/or radial spraybars interdigitated with the radial flameholders radially inwardly into an exhaust flowpath of the augmentor just forward and upstream of the trapped vortex cavity pilot at a radially outer portion of a combustion zone of the exhaust flowpath. An annular trapped dual vortex cavity pilot version is operable for producing trapped dual counter-rotating inner and outer vortices of fuel and air mixtures.

29 Claims, 13 Drawing Sheets

AUGMENTOR WITH TRAPPED VORTEX CAVITY PILOT

The Government has rights to this invention pursuant to Contract No. N00019-96-C-0176 awarded by the United States Department of Defense.

BACKGROUND OF THE INVENTION

The present invention relates generally to aircraft gas turbine engines with thrust augmenting afterburners and, more specifically, afterburners and augmentors with trapped vortex cavities.

High performance military aircraft typically include a turbofan gas turbine engine having an afterburner or augmentor for providing additional thrust when desired particularly for supersonic flight. The turbofan engine includes in downstream serial flow communication, a multistage fan, a multistage compressor, a combustor, a high pressure turbine powering the compressor, and a low pressure turbine powering the fan. A bypass duct surrounds and allows a portion of the fan air to bypass the multistage compressor, combustor, high pressure, and low pressure turbine.

During operation, air is compressed in turn through the fan and compressor and mixed with fuel in the combustor and ignited for generating hot combustion gases which flow downstream through the turbine stages which extract energy therefrom. The hot core gases are then discharged into an exhaust section of the engine which includes an afterburner from which they are discharged from the engine through a variable area exhaust nozzle.

Afterburners are located in exhaust sections of engines which includes an exhaust casing and an exhaust liner circumscribing a combustion zone. Fuel injectors (such as spraybars) and flameholders are mounted between the turbines and the exhaust nozzle for injecting additional fuel when desired during reheat operation for burning in the afterburner for producing additional thrust. Thrust augmentation or reheat using such fuel injection is referred to as wet operation while operating dry refers to not using the thrust augmentation. The annular bypass duct extends from the fan to the afterburner for bypassing a portion of the fan air around the core engine to the afterburner. This bypass air is mixed with the core gases and fuel from the spraybars, ignited, and combusted prior to discharge through the exhaust nozzle. The bypass air is also used in part for cooling the exhaust liner.

Various types of flameholders are known and provide local low velocity recirculation and stagnation regions therebehind, in regions of otherwise high velocity core gases, for sustaining and stabilizing combustion during reheat operation. Since the core gases are the product of combustion in the core engine, they are initially hot, and are further heated when burned with the bypass air and additional fuel during reheat operation. Augmentors currently are used to maximize thrust increases and tend to be full stream and consume all available oxygen in the combustion process yielding high augmentation ratios for example about 70%.

In regions immediately downstream of the flameholder, the gas flow is partially recirculated and the velocity is less than the rate of flame propagation. In these regions, there will be a stable flame existing which can ignite new fuel as it passes. Unfortunately, flameholders in the gas stream inherently cause flow losses and reduced engine efficiency. Several modern gas turbine engine's and designs include radially extending spraybars and flameholders in an effort to improve flame stability and reduce the flow losses. Radial spraybars integrated with radial flameholders are disclosed in U.S. Pat. Nos. 5,396,763 and 5,813,221. Radial spraybars disposed between radial flameholders having integrated radial spraybars have been incorporated in the GE F414 and GE F110-132 aircraft gas turbine engines. This arrangement provides additional dispersion of the fuel for more efficient combustion and unload fueling of the radial flameholders with the integrated radial spraybars so that they do not blowout and or have unstable combustion due to excess fueling.

Since fuel is typically injected upstream of the flameholders, undesirable auto-ignition of the fuel and combustion which might occur upstream of the flameholders causes flameholder distress which also significantly reduces the useful life of the flameholders. Since V-gutter flameholders are suspended within the core gases, they are more difficult to effectively cool and, typically, experience circumferential variation in temperature, which correspondingly effects thermal stress, which also decreases the useful life thereof. V-gutter flameholders have limited flameholding capability and their aerodynamic performance and characteristics negatively impact the size, performance, and thrust capability of the engine. This is, in part, due to the combustion zone having sufficient length to allow substantially complete combustion of the fuel added by the spraybars prior to discharge through the nozzle and wide ranging flight speeds and Mach numbers. It is, therefore, highly desirable to have an augmentor with a flame stabilization apparatus that has better performance characteristics than previous afterburners or augmentors.

BRIEF DESCRIPTION OF THE INVENTION

A gas turbine engine augmentor includes an annular trapped vortex cavity pilot having a cavity forward wall, a cavity radially outer wall, and a cavity aft wall, and an annular cavity therebetween. A cavity opening extends between the cavity forward and aft walls at a radially inner end of the cavity. Cavity fuel injector tubes are operably disposed through the outer wall into the cavity. An exemplary embodiment of the augmentor further includes circumferentially spaced apart radial flameholders having integral spraybars which are integral with the radial flameholders and extending radially inwardly into an exhaust flowpath of the augmentor. Radial spraybars extend radially inwardly into the exhaust flowpath and are circumferentially interdigitated with the radial flameholders. The annular trapped vortex cavity pilot is located just aft and downstream of the radial spraybars and the radial flameholders at a radially outer portion of a combustion zone of the exhaust flowpath. The annular trapped vortex cavity pilot is formed in the combustion liner.

Circumferential rows of film cooling apertures are disposed through the cavity forward wall, the cavity radially outer wall, and the cavity aft wall and angled for flowing cooling air in a counter-clockwise rotational direction. The film cooling apertures in adjacent rows of the circumferential rows are angularly offset in the cavity forward wall, the cavity radially outer wall, and the cavity aft wall. One or more igniters disposed within the cavity of the trapped vortex cavity pilot are located axially aft of the cavity fuel injector tubes. Fuel holes of the cavity fuel injector tubes located inside the cavity of the trapped vortex cavity pilot are aimed for spraying fuel circumferentially around the annular cavity with respect to an axial centerline axis of the trapped vortex cavity pilot.

In another embodiment of the augmentor, the annular trapped vortex cavity pilot is an annular trapped dual vortex cavity pilot operable for producing trapped dual counter-rotating inner and outer vortices of fuel and air mixtures. First and second sets of the circumferential rows of the film cooling apertures are disposed through the cavity forward wall, the cavity radially outer wall, and the cavity aft wall. The film cooling apertures are angled to flow film cooling air in circular directions for forming and strengthening the inner and outer vortices. The first set of the circumferential rows of the film cooling apertures are angled in a clockwise rotational direction in a radially outer section of the dual vortex cavity pilot and the second set of circumferential rows of film cooling apertures are angled in a counter-clockwise rotational direction in a radially inner section of the dual vortex cavity pilot. Air injection first holes disposed through the forward wall in the radially outer section of the dual vortex cavity pilot are positioned lengthwise along the forward wall close to the radially outer wall and air injection second holes disposed through the aft wall in the radially inner section are positioned radially approximately midway between the radially outer wall and the cavity opening.

A method for operating the gas turbine engine augmentor includes supplying fuel to the annular trapped vortex cavity pilot by flowing the fuel through the cavity fuel injector tubes extending through the outer wall and into the cavity and injecting the fuel directly into the cavity and producing at least one annular rotating vortex of a fuel and air mixture and igniting the fuel and air mixture within the cavity. An exemplary embodiment of the method further includes injecting the fuel into the exhaust flowpath through the radial spraybars and/or the integral spraybars that are integral with the radial flameholders and igniting the fuel from the radial spraybars and/or integral spraybars using the trapped vortex cavity pilot.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
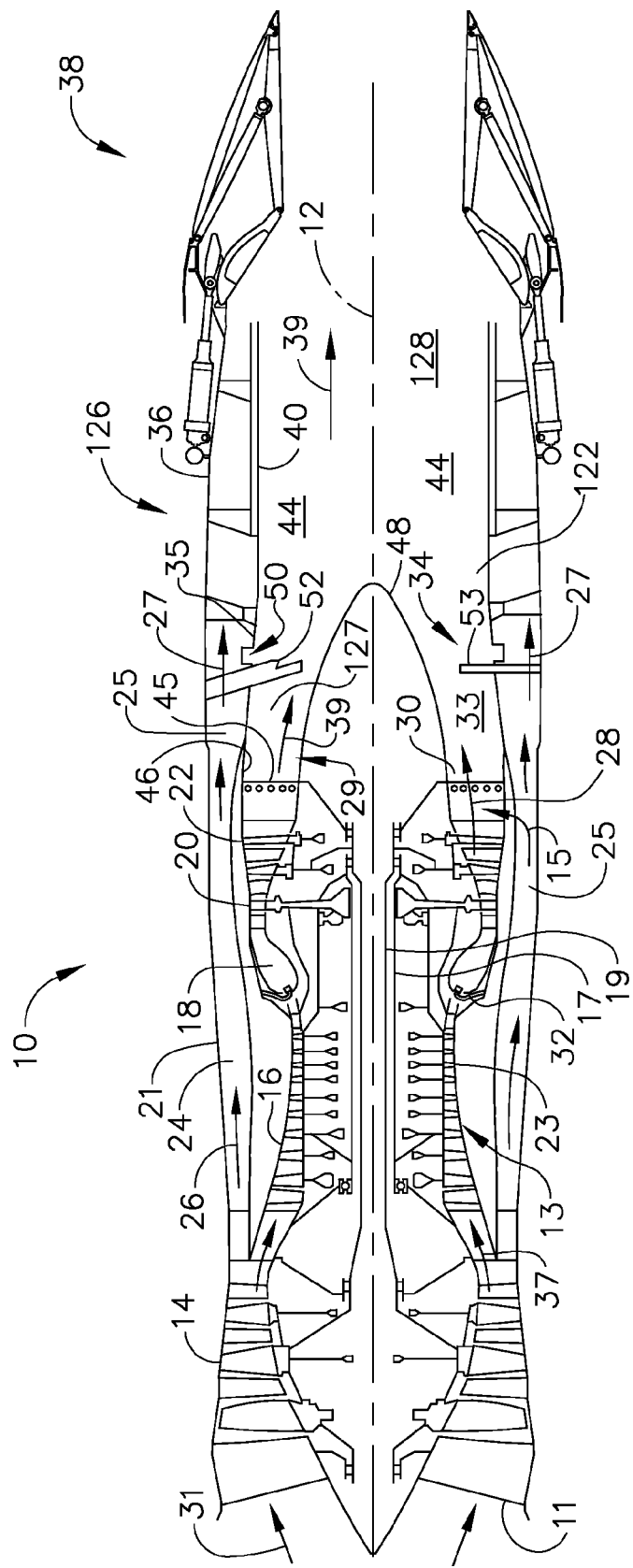
FIG. 1 is an axial sectional view illustration through an exemplary turbofan gas turbine engine having an augmentor with a trapped vortex cavity pilot.

Illustrated in FIG. 1 is an exemplary medium bypass ratio turbofan gas turbine engine 10 for powering an aircraft (not shown) in flight. The engine 10 is axisymmetrical about a longitudinal or axial centerline axis 12 and has a fan section 14 upstream of a core engine 13. The core engine 13 includes, in serial downstream flow communication, a multistage axial high pressure compressor 16, an annular combustor 18, and a high pressure turbine 20 suitably joined to the high pressure compressor 16 by a high pressure drive shaft 17. Downstream of the core engine 13 is a multistage low pressure turbine 22 suitably joined to the fan section 14 by a low pressure drive shaft 19. The core engine 13 is contained within a core engine casing 23 and an annular bypass duct 24 containing a bypass flowpath 25 circumscribed about the core engine 13. An engine casing 21 circumscribes the bypass duct 24 which extends from the fan section 14 downstream past the low pressure turbine 22.

Engine air 31 enters the engine through an engine inlet 11 and is initially pressurized as it flows downstream through the fan section 14 with an inner portion thereof referred to as core engine air 37 flowing through the high pressure compressor 16 for further compression. An outer portion of the engine air is referred to as bypass air 26 and is directed to bypass the core engine 13 and flow through the bypass duct 24. The core engine air is suitably mixed with fuel by main combustor fuel injectors 32 and carburetors in the combustor 18 and ignited for generating hot combustion gases which flow through the turbines 20, 22. The hot combustion gases are discharged through an annular core outlet 30 as core gases 28 into a core stream flowpath 127 which is an upstream portion of an exhaust flowpath 128 extending downstream and aftwardly of the turbines 20, 22 and through a diffuser 29 which is aft and downstream of the turbines 20, 22 in the engine 10. The core stream flowpath 127 is located radially inwardly of the bypass duct 24.

The diffuser 29 includes a diffuser duct 33 circumscribed by an annular radially outer diffuser liner 46 and is used to decrease the velocity of the core gases 28 as they enter an augmentor 34 located radially within an exhaust casing 36 of the engine aft and downstream of the diffuser 29. The centerline axis 12 is also the centerline axis of the augmentor 34 which is circumferentially disposed around the centerline axis 12. A converging centerbody 48 extending aft from the core outlet 30 and partially into the augmentor 34 radially inwardly bounds the diffuser duct 33. The diffuser 29 is axially spaced apart upstream or forwardly of a forward end 35 of a combustion liner 40 inside the exhaust casing 36. A combustion zone 44 in the exhaust flowpath 128 is circumscribed or surrounded by the combustion liner 40 and located radially inwardly from the bypass duct 24 and downstream and aft of the augmentor 34.

Figure 2:
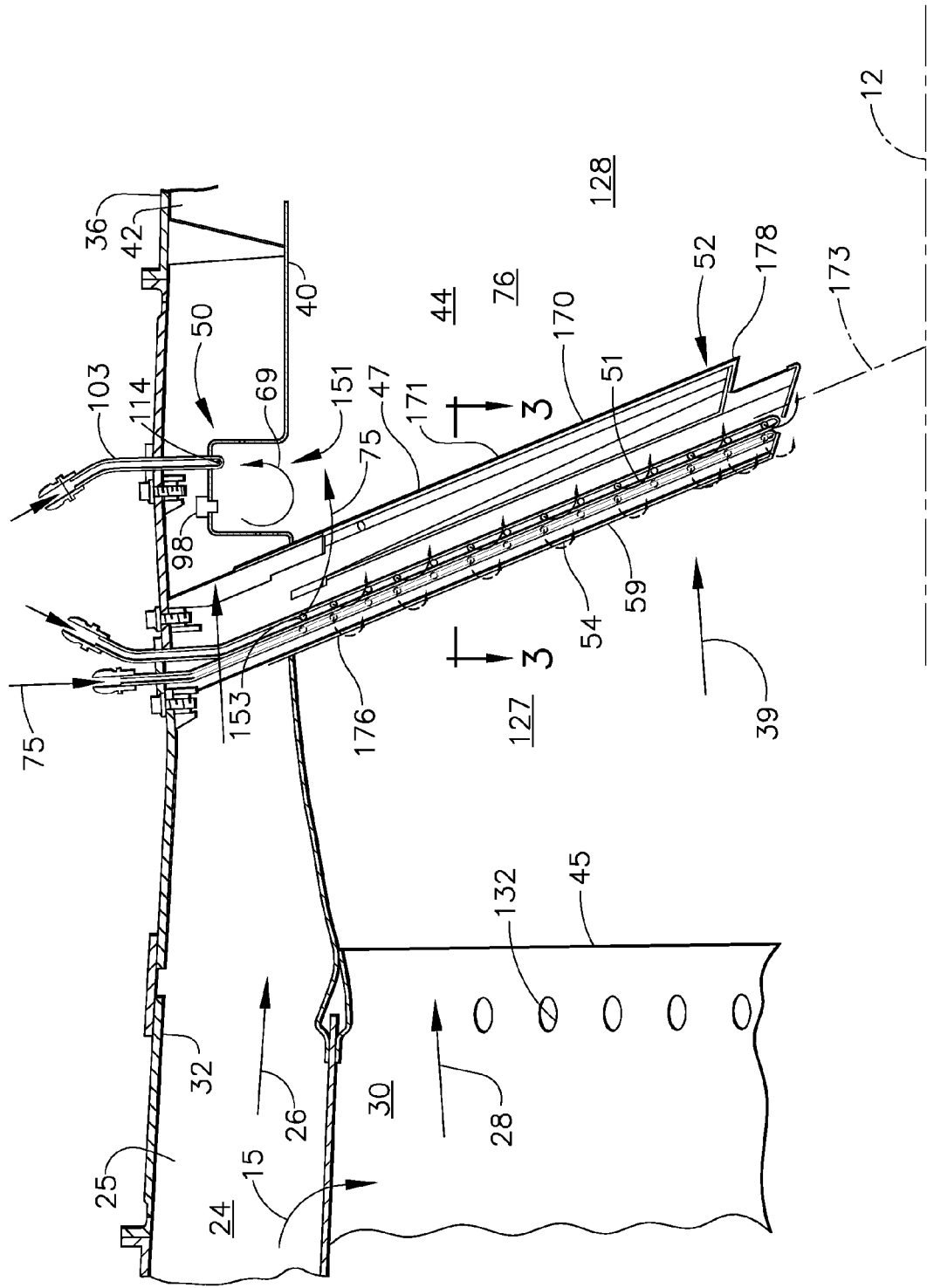
FIG. 2 is an enlarged axial sectional view illustration of a radial flameholder and the vortex cavity pilot illustrated in FIG. 1.

Referring to FIGS. 1 and 2, exhaust vanes 45 extend radially across the exhaust flowpath 128. The exhaust vanes 45 are typically hollow and curved. The hollow exhaust vanes 45 are designed to receive a first portion 15 of the bypass air 26 and flow it into the exhaust flowpath 128 through air injection holes 132. The bypass air 26 and the core gases 28 mix together to form an exhaust flow 39. The exhaust section 126 includes an annular exhaust casing 36 disposed co-axially with and suitably attached to the corresponding engine casing 21 and surrounding the exhaust flowpath 128. Mounted to the aft end of the exhaust casing 36 is a variable area converging-diverging exhaust nozzle 38 through which the exhaust flow 39 are discharged during operation.

Figure 4:
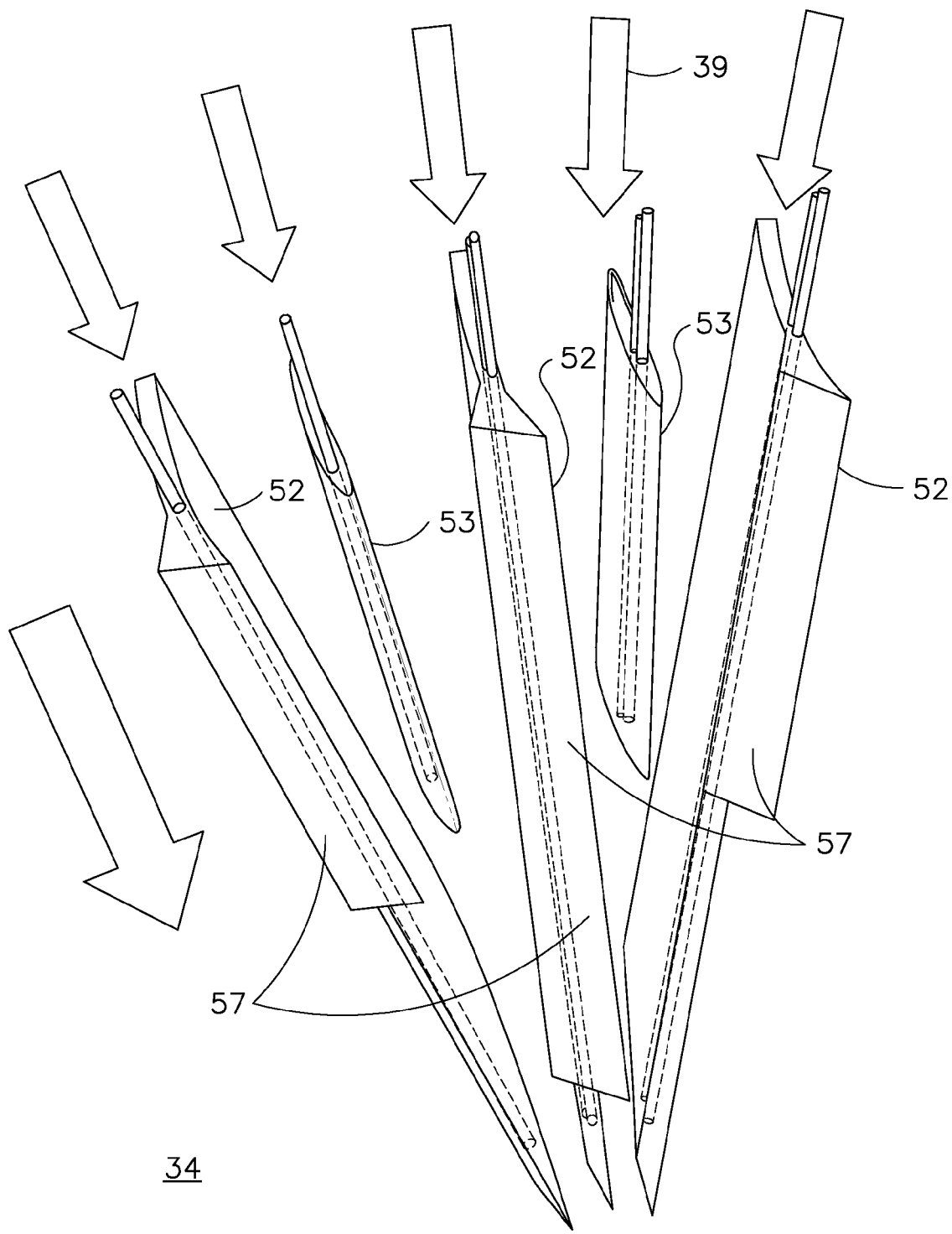
FIG. 4 is a perspective view illustration of a portion of radial spraybars disposed between the radial flameholders in the augmentor illustrated in FIG. 3.

The exhaust section 126 further includes an annular exhaust combustion liner 40 spaced radially inwardly from the exhaust casing 36 to define an annular cooling duct 42 disposed in flow communication with the bypass duct 24 for receiving therefrom a second portion 27 of the bypass air 26. An exhaust section combustion zone 44 within the exhaust flowpath 128 is located radially inwardly from the combustion liner 40 and the bypass duct 24 and downstream or aft of the core engine 13 and the low pressure turbine 22. The exemplary embodiment of the augmentor 34 illustrated herein includes a plurality of circumferentially spaced apart radial flameholders 52 extending radially inwardly from the outer diffuser liner 46 into the exhaust flowpath 128. Each of the radial flameholders 52 includes an integral spraybar 59. The radial flameholders 52 are circumferentially interdigitated with radial spraybars 53, i.e. one radial spraybar 53 between each circumferentially adjacent pair 57 of the radial flameholders 52, as illustrated in FIG. 4.

Figure 3:
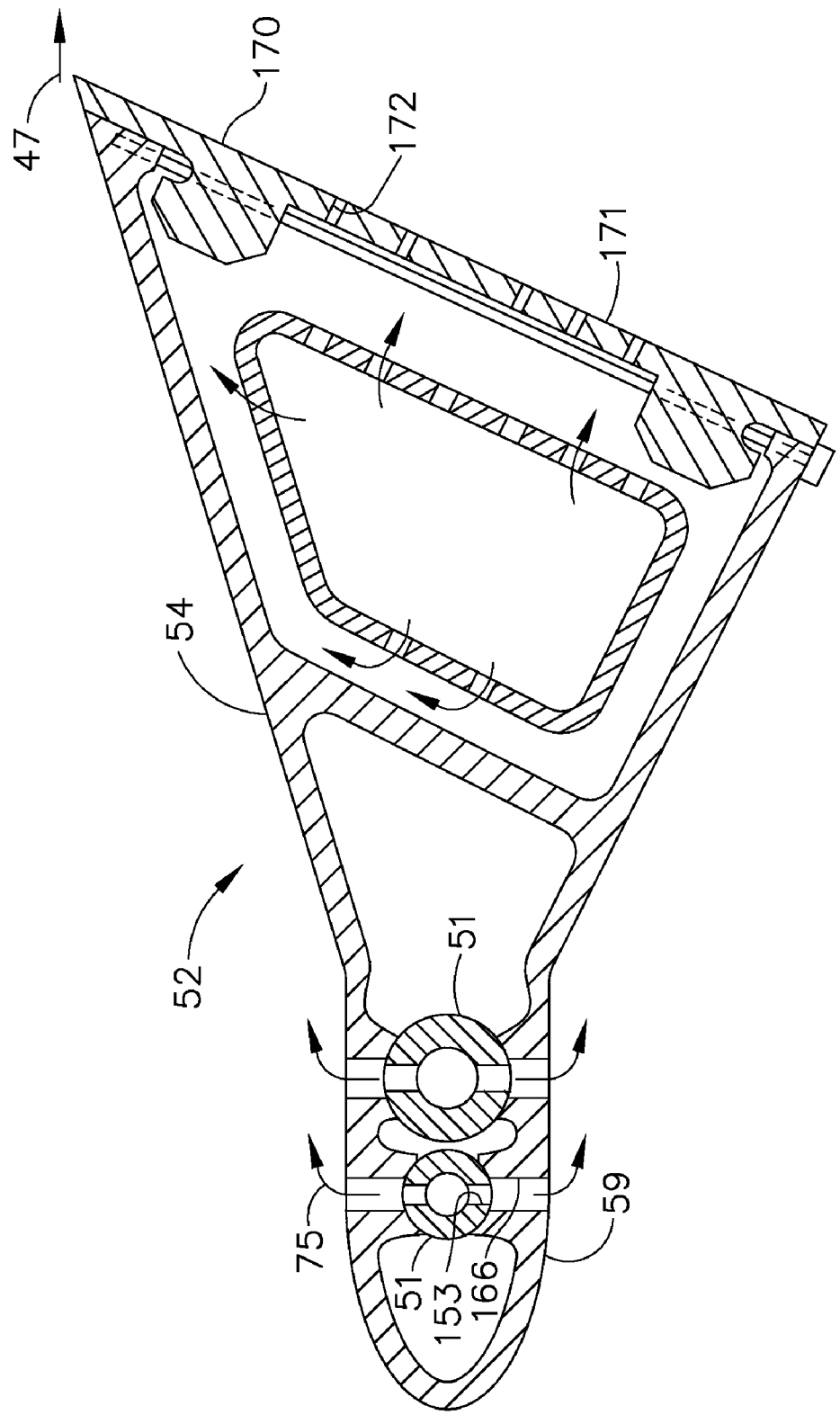
FIG. 3 is a sectional view illustration through 3-3 of the radial flameholder illustrated in FIG. 2.

Referring further to FIGS. 2 and 3, the integral spraybar 59 in each radial flameholder 52 includes one or more fuel tubes 51 therein. The fuel tubes 51 are suitably joined in flow communication with a conventional fuel supply (not illustrated herein) which is effective for channeling fuel 75 to each of the fuel tubes for injecting the fuel 75 into the exhaust flowpath 128 downstream of the exhaust vanes 45 and upstream of the combustion zone 44. Similar air cooled flameholders are disclosed in detail in U.S. Pat. Nos. 5,813,221 and 5,396,763 both of which are assigned to the present assignee and incorporated herein by reference.

Each of the radial flameholders 52 includes a flameholder heat shield 54 surrounding the fuel tubes 51. Fuel holes 153 in the fuel tubes 51 are operable for injecting fuel 75 through heat shield openings 166 in the flameholder heat shield 54 into the exhaust flowpath 128. A generally aft and downstream facing flameholding wall 170 having a flat outer surface 171 includes film cooling holes 172 and is located on an aft end of the flameholder heat shield 54. The radial flameholders 52 are swept downstream from radially outer ends 176 towards radially inner ends 178 of the radial flameholders as illustrated in FIG. 2. The flameholding wall 170 and the flat outer surface 171 are canted about a wall axis 173 that is angled with respect to the centerline axis 12 of the engine.

Referring again to FIG. 4, the augmentor fuel radial spraybars 53 are circumferentially disposed between the radial flameholders 52. The augmentor 34 is illustrated herein with one radial spraybar 53 between each circumferentially adjacent pair of the radial flameholders 52. Other embodiments of the augmentor 34 can employ more than one radial spraybar 53 between each radial flameholder 52. Yet, other embodiments of the augmentor 34 can employ less radial spraybars 53 in which some of the adjacent pairs of the radial flameholders 52 have no radial spraybar 53 therebetween and others of the adjacent pairs of the radial flameholders 52 at least one radial spraybar 53 therebetween.

Figure 5:
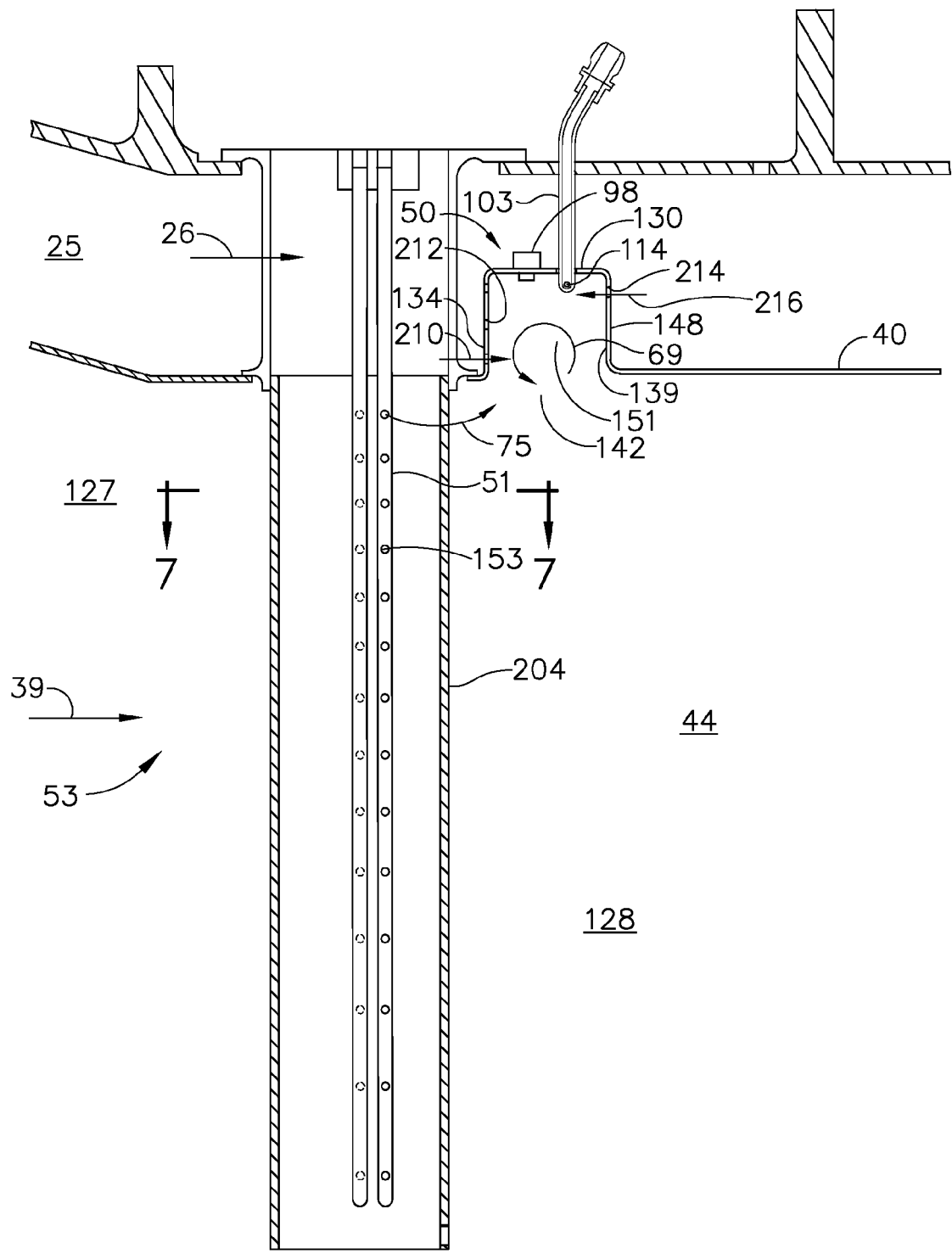
FIG. 5 is an enlarged axial sectional view illustration of the radial spraybar illustrated in FIGS. 1 and 4.
Figure 6:
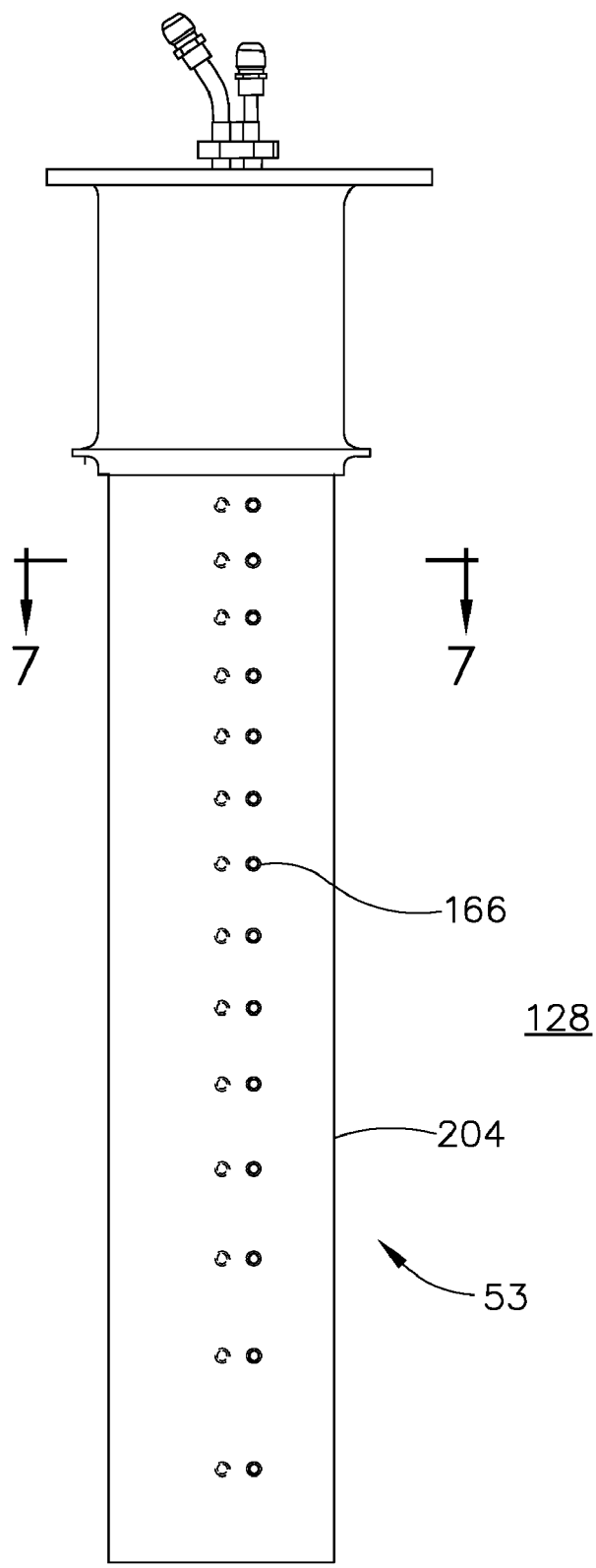
FIG. 6 is an enlarged elevational view illustration of the radial spraybar illustrated in FIGS. 1, 4, and 5.
Figure 7:
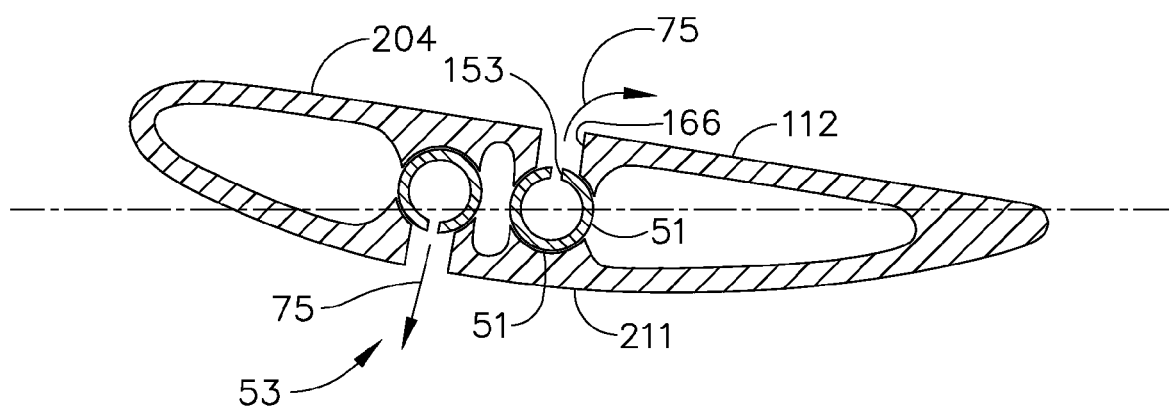
FIG. 7 is a sectional view illustration through 7-7 of the radial spraybar illustrated in FIG. 6.

Referring to FIGS. 5, 6, and 7, each of the radial spraybars 53 includes a spraybar heat shield 204 surrounding one or more fuel tubes 51. The radial spraybars 53 are illustrated herein as having two fuel tubes 51. Fuel holes 153 in the fuel tubes 51 are operable for injecting fuel 75 through openings 166 in the spraybar heat shields 204 into the exhaust flowpath 128. Referring back to FIGS. 1 and 2, the first portion 15 of the bypass air 26 mixes with core gases 28 in the exhaust flowpath 128 to form the exhaust flow 39 and further downstream with other portions of the bypass air 26. The augmentor 34 uses the oxygen in the exhaust flowpath 128 for combustion.

Illustrated in FIG. 7, is an airfoil cross-section 211 of the spraybar heat shields 204. The airfoil cross-section 211 illustrates an outer wall 112 of the airfoil shaped spraybar heat shields 204. Fuel 75 from the fuel tubes 51 of the radial spraybars 53 and from the fuel tubes 51 of the radial flameholders 52 inject the fuel 75 into the exhaust flowpath 128 downstream of the exhaust vanes 45 forming an fuel/air mixture 76 for combustion in the combustion zone 44. The fuel 75 from the fuel holes 153 in the fuel tubes 51 of the radial flameholders 52 and the radial spraybars 53 is combusted in the combustion zone 44 for thrust augmentation from the exhaust nozzle 38.

The fuel/air mixture 76 is ignited and stabilized by an internally fueled annular trapped vortex cavity pilot 50 illustrated in FIGS. 1, 2, 5, and 8. The annular trapped vortex cavity pilot 50 may be circumferentially segmented. The annular trapped vortex cavity pilot 50 is illustrated as being formed in the combustion liner 40. The trapped vortex cavity pilot 50 is utilized to produce an annular rotating vortex 69 of a fuel and air mixture. The trapped vortex cavity pilot 50 includes a cavity forward wall 134, a cavity radially outer wall 130, and a cavity aft wall 148 which define an annular cavity 151 therebetween. A cavity opening 142 extends between the cavity forward and aft walls 134, 148 at a radially inner end 139 of the cavity 151. A plurality of cavity fuel injector tubes 103 are operably disposed through the outer wall 130 into the cavity 151 of the trapped vortex cavity pilot 50 for supplying substantially all of the fuel needed for the trapped vortex cavity pilot 50 to function as a pilot to ignite the fuel/air mixture 76 in the combustion zone 44 illustrated in FIGS. 1, 2, and 5.

Figure 8:
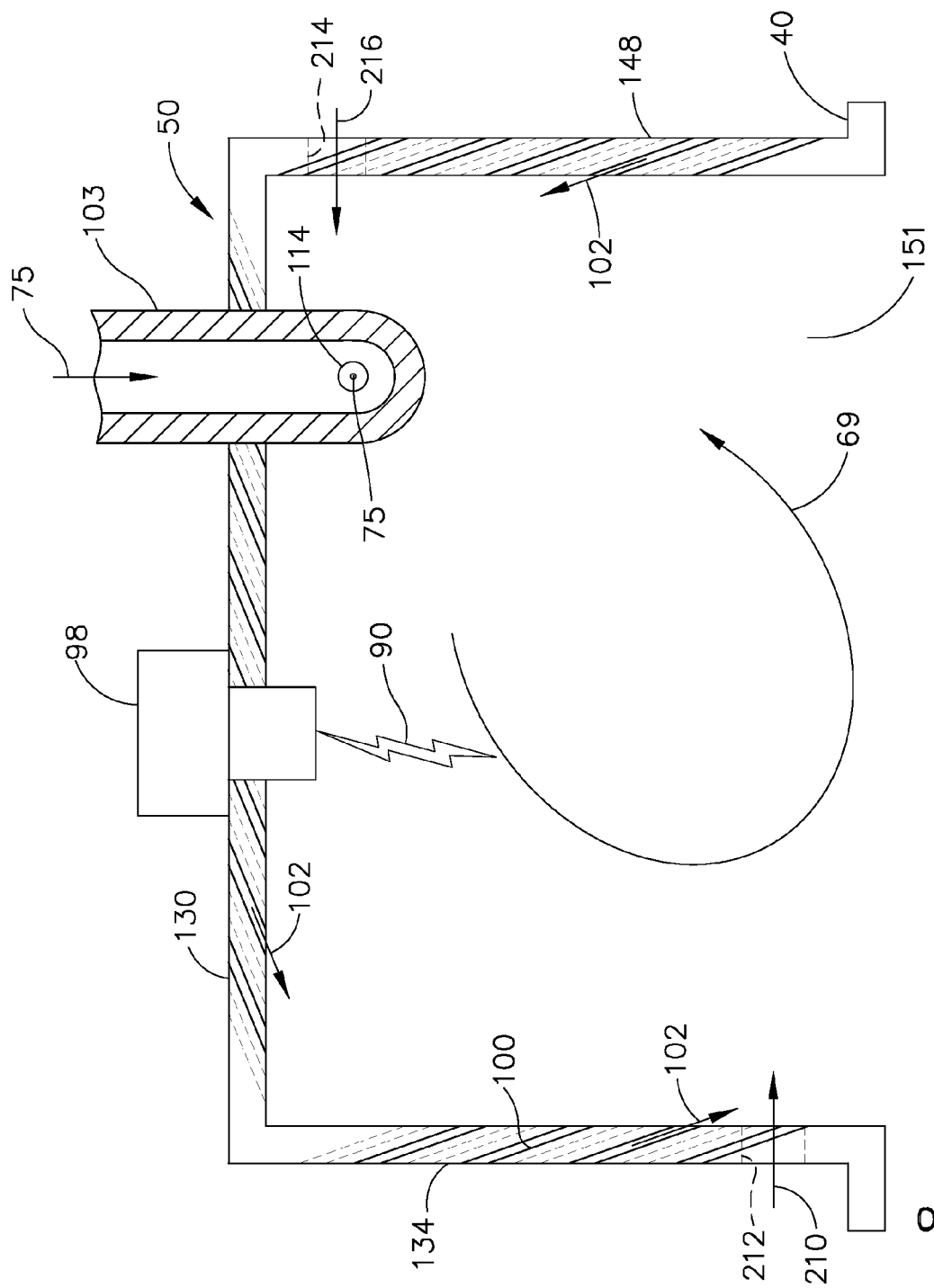
FIG. 8 is an enlarged axial sectional view illustration of the trapped vortex cavity pilot illustrated in FIGS. 1 and 2.

The cavity opening 142 is open to combustion zone 44 in the exhaust flowpath 128 and is spaced radially apart and inwardly of the cavity radially outer wall 130. Referring to FIGS. 5 and 8, vortex driving aftwardly injected air 210 from the bypass air 26 is injected through air injection first holes 212 in the cavity forward wall 134 at a radial position along the forward wall near the opening 142 at the radially inner end 139 of the cavity 151. Vortex driving forwardly injected air 216 is injected through air injection second holes 214 in the cavity aft wall 148 positioned radially near the cavity radially outer wall 130.

Figure 10:
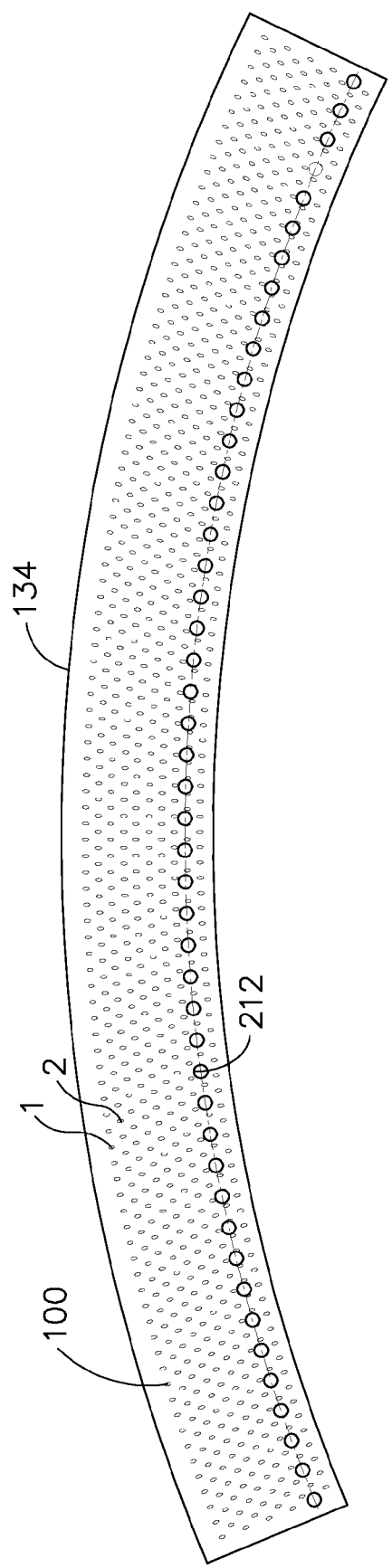
FIGS. 10, 11, and 12 are planform views of cavity forward wall, radially outer, and aft walls which define an annular cavity of the trapped vortex cavity pilot illustrated in FIGS. 1 and 2.
Figure 11:
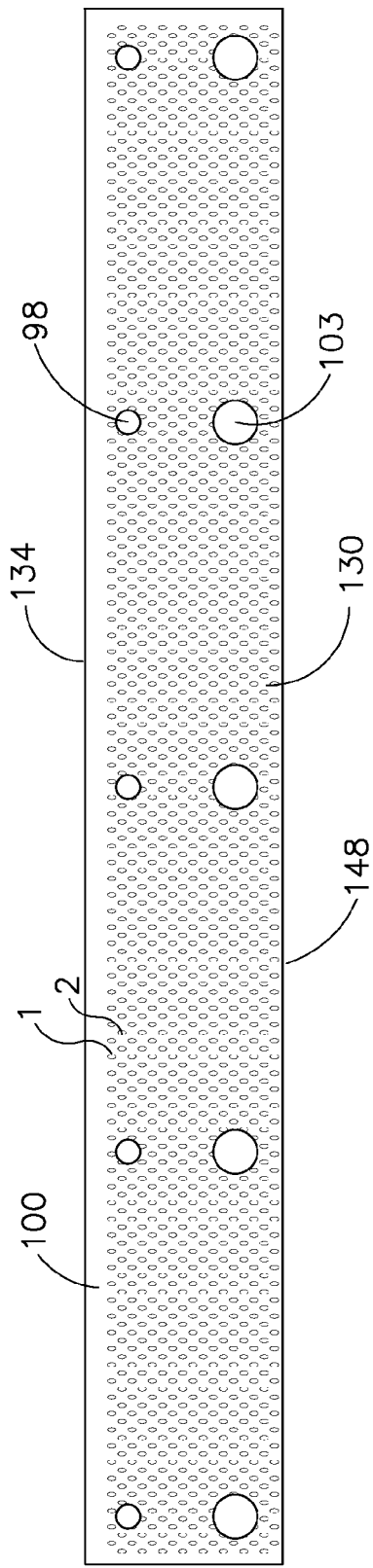
Figure 12:
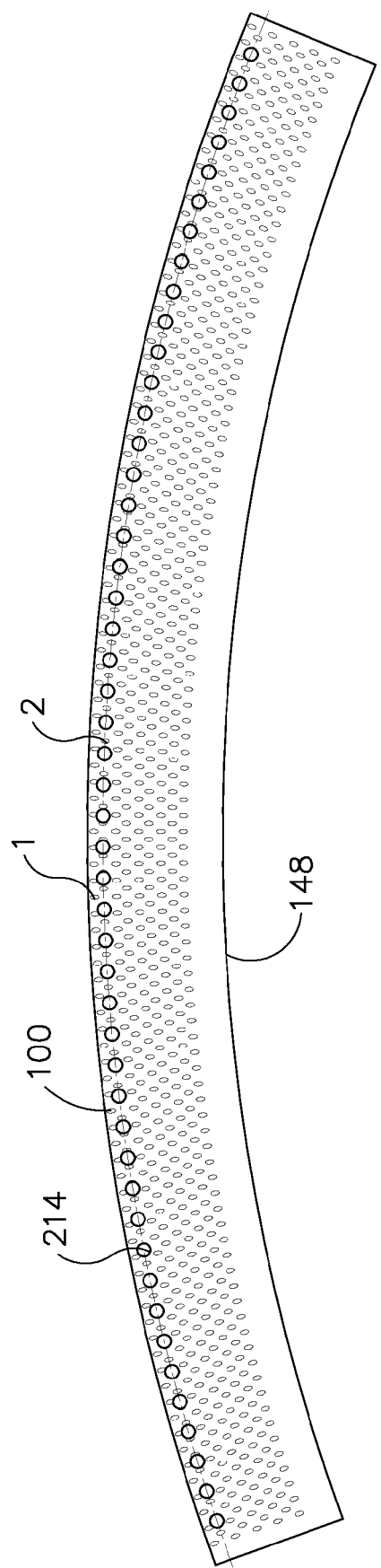

Circumferential rows 99 of film cooling apertures 100 disposed through the cavity forward wall 134, the cavity radially outer wall 130, and the cavity aft wall 148 of the trapped vortex cavity pilot 50 are angled to flow cooling air 102 in a counter-clockwise rotational direction 104 of the annular rotating vortex 69 of fuel and air which further promotes the formation of and increases the strength of the annular rotating vortex 69. As can be seen in FIGS. 10, 11, and 12, the film cooling apertures 100 in adjacent rows 1 and 2 of the circumferential rows 99 are circumferentially or angularly offset in the cavity forward wall 134, the cavity radially outer wall 130, and the cavity aft wall 148.

At least one igniter 98 is operably disposed within the trapped vortex cavity pilot 50 for igniting a fuel and air mixture in vortex cavity which then expands into the combustion zone 44 igniting the fuel and air mixture therein. Only one igniter is illustrated in the FIGS. but more than one may be used. One or more of the cavity fuel injector tubes 103 are located upstream, with respect to the counter-clockwise rotational direction 104 of the annular rotating vortex 69, of the igniter(s) 98 and operably located to spray fuel 75 so that it will be entrained in the vortex 69 and pass through a spark 90 for ignition from the igniter 98.

Figure 14:
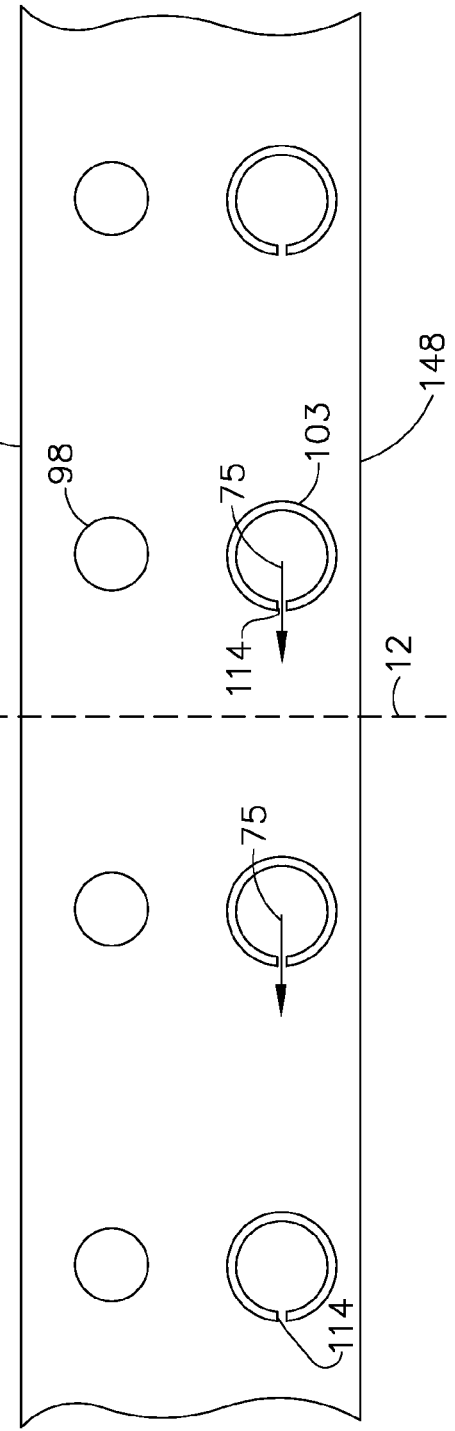
FIG. 14 is an enlarged sectional planform view illustration of fuel injection tubes and igniters in the trapped vortex cavity pilot illustrated in FIGS. 5 and 8.

Referring further to FIG. 14, the cavity fuel injector tubes 103 includes fuel holes 114 located inside the trapped vortex cavity pilot 50 and aimed or oriented to spray fuel circumferentially around the annular cavity 151 with respect to the axial centerline axis 12 for good fuel dispersion and flame propagation. The one or more igniters 98 are downstream of the cavity fuel injector tubes 103 with respect to the rotating vortex 69 of the fuel and air mixture and the cavity fuel injector tubes 103 are axially aft of the one or more igniters 98.

The circumferentially disposed annular trapped vortex cavity pilot 50, as illustrated in FIGS. 1, 2, and 5, faces radially inwardly towards the centerline axis 12 in the combustion zone 44 so as to be in direct unobstructed fluid communication with the combustion zone 44. The annular trapped vortex cavity pilot 50 is located just aft and downstream of the radial spraybars 53 and the radial flameholders 52 at a radially outer portion 122 of the combustion zone 44 for maximizing flame ignition and stabilization in the combustion zone 44 during thrust augmentation or reheat.

Figure 13:
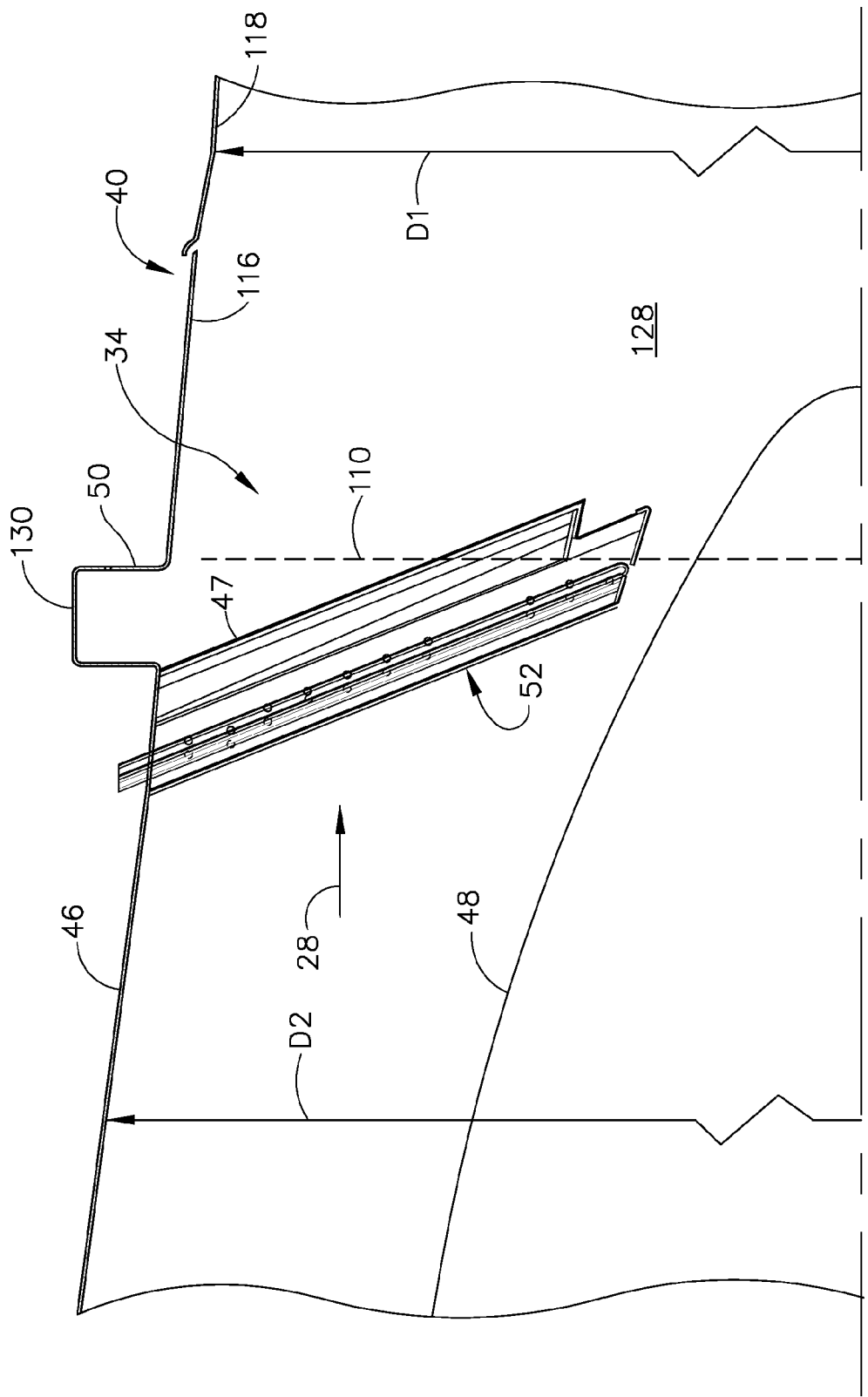
FIG. 13 is an enlarged axial sectional view illustration of a combustion liner within an exhaust casing of the engine illustrated in FIGS. 1 and 2.

Referring to FIG. 13, the combustion liner 40 of the engine 10 illustrated herein, is an assembly including an augmentor liner 116 forward and upstream of and in an operably cooperating relationship with a tailpipe liner 118 to form the combustion liner 40 inside the exhaust casing 36. The annular trapped vortex cavity pilot 50 is formed in the augmentor liner 116 and transition smoothly to the tailpipe liner 118. The annular trapped vortex cavity pilot 50 initiates and propagates a flame around the augmentor to the radial flameholder 52. The annular trapped vortex cavity pilot 50 is closed on the cavity radially outer wall 130 and, thus, flame impingement is not a risk. The combustion liner 40 and, in particular, its tailpipe liner 118 has a tailpipe liner diameter D1 smaller than a diffuser liner diameter D2 of the outer diffuser liner 46 as illustrated in FIG. 5. This prevents local velocities of the core gases 28 at flameholder lips 47 of the radial flameholder 52 from getting too high for stable combustion and possibly causing the core gases 28 flowing through a flameholder plane 110 to choke at some operating conditions.

The combustion liner 40 inside the exhaust casing 36 transitions radially inwardly at a location aft or downstream of the radial flameholder 52 and the use of the annular trapped vortex cavity pilot 50 can prevent catastrophic failure of the combustion liner 40 due to flame impingement. If the outer diffuser liner 46 was located more radially inward, the flameholder lip velocities would be too high for stable combustion and the velocity of the core gases 28 passing through the flameholder plane could actually choke at some operating conditions.

Figure 9:
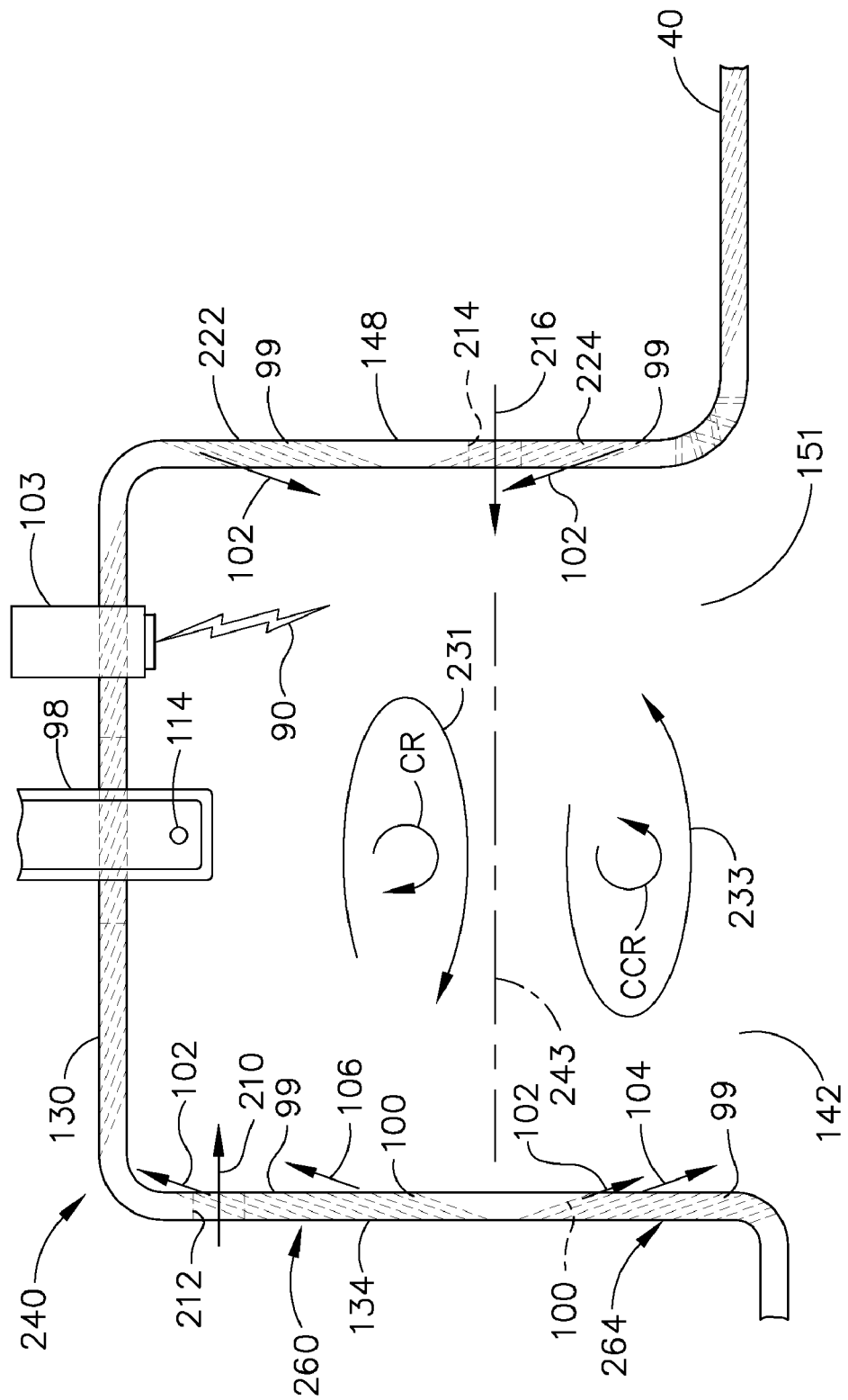
FIG. 9 is an axial sectional view illustration of an alternative trapped vortex cavity pilot having a dual vortex cavity for use in the augmentor illustrated in FIGS. 1 and 2.

An alternative annular trapped vortex cavity pilot is illustrated in FIG. 9. It is an annular trapped dual vortex cavity pilot 240 illustrated as being formed in the combustion liner 40. The trapped dual vortex cavity pilot 240 is operable to produce trapped dual counter-rotating vortices indicated by radially inner and outer vortices 233, 231 of fuel and air mixtures in the annular cavity 151. The dual vortex cavity pilot 240 includes a cavity forward wall 134, a cavity radially outer wall 130, and a cavity aft wall 148 which define the cavity 151 therebetween. A cavity opening 142 extends between the cavity forward and aft walls 134, 148 at a radially inner end 139 of the cavity 151 dual vortex cavity pilot 240. A plurality of cavity fuel injector tubes 103 are operably disposed through the outer wall 130 into the cavity 151 of the dual vortex cavity pilot 240 for supplying substantially all of the fuel needed for the dual vortex cavity pilot 240 to function as a pilot to ignite the fuel/air mixture 76 in the combustion zone 44 illustrated in FIGS. 1, 2, and 5.

Vortex driving aftwardly injected air 210 is injected through air injection first holes 212 in the forward wall 134 positioned radially along the forward wall as close as possible to the radially outer wall 130 to promote clockwise rotation CR of the radially outer vortex 231. Vortex driving forwardly injected air 216 is injected through air injection second holes 214 in the aft wall 148 positioned radially approximately midway between the radially outer wall 130 and the cavity opening 142 to promote counter-clockwise rotation CCR of the radially inner vortex 233. The forwardly injected air 216 also defines an annular boundary 243 between the inner and outer vortices 233, 231.

First and second sets 222, 224 of circumferential rows 99 of film cooling apertures 100 disposed through the cavity forward wall 134, the cavity radially outer wall 130, and the cavity aft wall 148 of the annular trapped dual vortex cavity pilot 240 are angled to flow film cooling air 102 in circular directions to promote formation and to strengthen the inner and outer vortices 233, 231. The film cooling apertures 100 are angled to flow the film cooling air 102 in the direction of the vortices nearby. The first set 222 of circumferential rows 99 of film cooling apertures 100 are located in a radially outer section 260 of the dual vortex cavity pilot 240 and angled in a clockwise rotational direction 106 to promote clockwise rotation CR of the radially outer vortex 231. The second set 224 of circumferential rows 99 of film cooling apertures 100 are located in a radially inner section 264 of the dual vortex cavity pilot 240 and angled in a counter-clockwise rotational direction 104 to promote counter-clockwise rotation CCR of the radially inner vortex 233.

Vortex driving forwardly injected air 216 is injected through air injection second holes 214 in the aft wall 148 positioned radially approximately midway between the radially outer wall 130 and the cavity opening 142 to promote counter-clockwise rotation of the radially inner vortex 233. The film cooling apertures 100 in adjacent rows of the circumferential rows 99 are circumferentially or angularly offset in the cavity forward wall 134, the cavity radially outer wall 130, and the cavity aft wall 148 similar to the arrangement illustrated in FIGS. 10, 11, and 12. One or more of the cavity fuel injector tubes 103 are located upstream, with respect to the clockwise rotation CR of the radially outer vortex 231, of the igniter(s) 98 and operably located to spray fuel 75 so that it will be entrained in the radially outer vortex 231 and pass through a spark 90 for ignition from the igniter 98. Referring further to FIG. 14, the cavity fuel injector tubes 103 includes fuel holes 114 located inside the trapped vortex cavity pilot 50 and aimed or oriented to spray fuel circumferentially around the annular cavity 151 with respect to the axial centerline axis 12 for good fuel dispersion and flame propagation.

The trapped vortex cavity afterburner provides reliable ignition of the afterburner while avoiding undesirable auto-ignition of the fuel which might occur upstream of the flameholders and also reduce or prevent flameholder distress which also significantly reduces the useful life of the flameholders. The trapped vortex cavity afterburner eliminates the need for V-gutter flameholders suspended within the core gases which are difficult to effectively cool and may experience circumferential variation in temperature which causes thermal stress, which also decreases the useful life of the V-gutter. Eliminating the V-gutter eliminates their aerodynamic performance losses and hence reduces their inherent negative impact on the size, performance, and thrust capability of the engine. The trapped vortex cavity afterburner provides the augmentor with a flame stabilization apparatus that has better performance characteristics than previous afterburners or augmentors.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention.

Accordingly, what is desired to be secured by Letters Patent of the United States is the invention as defined and differentiated in the following claims:

What is claimed:

1. A gas turbine engine augmentor comprising:
   an annular trapped vortex cavity pilot having a cavity forward wall, a cavity radially outer wall, and a cavity aft wall, and an annular cavity therebetween;
   a cavity opening extending between the cavity forward and aft walls at a radially inner end of the cavity;
   cavity fuel injector tubes operably disposed through the outer wall into the cavity;
   circumferentially spaced apart radial flameholders having integral spraybars integral with the radial flameholders and extending radially inwardly into an exhaust flowpath of the augmentor;
   radial spraybars extending radially inwardly into the exhaust flowpath and being circumferentially interdigitated with the radial flameholders; and
   the annular trapped vortex cavity pilot being located just aft and downstream of the radial spraybars and the radial flameholders at a radially outer portion of a combustion zone of the exhaust flowpath.

2. An augmentor according to claim 1 further comprising circumferential rows of film cooling apertures disposed through the cavity forward wall, the cavity radially outer wall, and the cavity aft wall and angled for flowing cooling air in a counter-clockwise rotational direction and the film cooling apertures in adjacent rows of the circumferential rows being angularly offset in the cavity forward wall, the cavity radially outer wall, and the cavity aft wall.

3. An augmentor according to claim 2 further comprising fuel holes of the cavity fuel injector tubes located inside the cavity of the trapped vortex cavity pilot and aimed for spraying fuel circumferentially around the annular cavity.

4. An augmentor according to claim 3 further comprising one or more igniters disposed within the cavity of the trapped vortex cavity pilot and located axially forward of the cavity fuel injector tubes.

5. An augmentor according to claim 4 further comprising the one or more igniters and the cavity fuel injector tubes arranged for spraying fuel to be entrained in a vortex formed in the cavity and pass through sparks of the one or more igniters.

6. An augmentor according to claim 5 further comprising: air injection first holes in the forward wall at a radial position along the forward wall near the opening, and air injection second holes in the cavity aft wall positioned radially near a cavity radially outer wall spaced radially outwardly of the opening.

7. An augmentor according to claim 6 further comprising the annular trapped vortex cavity pilot being formed in a combustion liner circumscribing the combustion zone.

8. An augmentor according to claim 1 further comprising the annular trapped vortex cavity pilot being an annular trapped dual vortex cavity pilot operable for producing trapped dual counter-rotating inner and outer vortices of fuel and air mixtures.

9. An augmentor according to claim 8 further comprising:
   first and second sets of the circumferential rows of the film cooling apertures disposed through the cavity forward wall, the cavity radially outer wall, and the cavity aft wall; and
   the film cooling apertures being angled to flow film cooling air in circular directions for forming and strengthening the inner and outer vortices.

10. An augmentor according to claim 9 further comprising:
    the first set of the circumferential rows of the film cooling apertures being angled in a clockwise rotational direction in a radially outer section of the dual vortex cavity pilot;
    the second set of circumferential rows of film cooling apertures being angled in a counter-clockwise rotational direction in a radially inner section of the dual vortex cavity pilot; and
    the film cooling apertures in adjacent rows of the circumferential rows being angularly offset in the cavity forward wall, the cavity radially outer wall, and the cavity aft wall.

11. An augmentor according to claim 10 further comprising:
    air injection first holes disposed through the forward wall in the radially outer section of the dual vortex cavity pilot and positioned radially along the forward wall close to the radially outer wall, and
    air injection second holes disposed through the aft wall in the radially inner section and positioned radially approximately midway between the radially outer wall and the cavity opening.

12. An augmentor according to claim 11 further comprising fuel holes of the cavity fuel injector tubes inside the cavity of the annular trapped dual vortex cavity pilot and aimed for spraying fuel circumferentially around the annular cavity.

13. An augmentor according to claim 12 further comprising at one or more igniters disposed within the cavity of the annular trapped dual vortex cavity pilot and located axially aft of the cavity fuel injector tubes.

14. An augmentor according to claim 13 further comprising the one or more igniters and the cavity fuel injector tubes arranged for spraying fuel to be entrained in a vortex formed in the cavity and pass through sparks of the one or more igniters.

15. A turbofan gas turbine engine comprising:
    a fan section upstream of a core engine;
    the core engine including in serial downstream flow communication a high pressure compressor, a combustor, and a high pressure turbine;
    a low pressure turbine downstream of the core engine;
    an annular bypass duct containing a bypass flowpath circumscribing the core engine;
    a diffuser located radially inwardly of the bypass duct and aft and downstream of the low pressure turbine and including an annular radially outer diffuser liner circumscribing a diffuser duct containing a portion of a core stream flowpath;
    a gas turbine engine augmentor disposed in an exhaust casing of the engine located aft and downstream of the diffuser;
    a combustion liner surrounding a combustion zone of the exhaust flowpath in the exhaust casing;
    the combustion liner having tailpipe liner diameter smaller than a diffuser liner diameter of the outer diffuser liner;

the augmentor including an annular trapped vortex cavity pilot having a cavity forward wall, a cavity radially outer wall, and a cavity aft wall, and an annular cavity therebetween;

a cavity opening extending between the cavity forward and aft walls at a radially inner end of the cavity;

cavity fuel injector tubes operably disposed through the outer wall into the cavity;

circumferentially spaced apart radial flameholders having integral spraybars integral with the radial flameholders and extending radially inwardly into an exhaust flowpath of the augmentory;

radial spraybars extending radially inwardly into the exhaust flowpath and being circumferentially interdigitated with the radial flameholders; and the annular trapped vortex cavity pilot being located just aft and downstream of the radial spraybars and the radial flameholders at a radially outer portion of a combustion zone of the exhaust flowpath.

16. An engine according to claim 15 further comprising circumferential rows of film cooling apertures disposed through the cavity forward wall, the cavity radially outer wall, and the cavity aft wall and angled for flowing cooling air in a counter-clockwise rotational direction and the film cooling apertures in adjacent rows of the circumferential rows being angularly offset in the cavity forward wall, the cavity radially outer wall, and the cavity aft wall.

17. An engine according to claim 16 further comprising fuel holes of the cavity fuel injector tubes located inside the cavity of the trapped vortex cavity pilot and aimed for spraying fuel circumferentially around the annular cavity.

18. An engine according to claim 17 further comprising one or more igniters disposed within the cavity of the trapped vortex cavity pilot and located axially forward of the cavity fuel injector tubes.

19. An engine according to claim 18 further comprising the one or more igniters and the cavity fuel injector tubes arranged for spraying fuel to be entrained in a vortex formed in the cavity and pass through sparks of the one or more igniters.

20. An engine according to claim 19 further comprising:
air injection first holes in the forward wall at a radial position along the forward wall near the opening, and
air injection second holes in the cavity aft wall positioned radially near a cavity radially outer wall spaced radially outwardly of the opening.

21. An engine according to claim 15 further comprising the annular trapped vortex cavity pilot being an annular trapped dual vortex cavity pilot operable for producing trapped dual counter-rotating inner and outer vortices of fuel and air mixtures.

22. An engine according to claim 21 further comprising: first and second sets of the circumferential rows of the film cooling apertures disposed through the cavity forward wall, the cavity radially outer wall, and the cavity aft wall; the film cooling apertures being angled to flow film cooling air in opposite first and second circular directions for forming and strengthening the inner and outer vortices respectively; and the film cooling apertures in adjacent rows of the circumferential rows being angularly offset in the cavity forward wall, the cavity radially outer wall, and the cavity aft wall.

23. An engine according to claim 22 further comprising:
the first set of the circumferential rows of the film cooling apertures being angled in a clockwise rotational direction in a radially outer section of the dual vortex cavity pilot; and
the second set of circumferential rows of film cooling apertures being angled in a counter-clockwise rotational direction in a radially inner section of the dual vortex cavity pilot.

24. An engine according to claim 23 further comprising:
air injection first holes disposed through the forward wall in the radially outer section of the dual vortex cavity pilot and positioned radially along the forward wall close to the radially outer wall, and
air injection second holes disposed through the aft wall in the radially inner section and positioned radially approximately midway between the radially outer wall and the cavity opening.

25. An engine according to claim 24 further comprising fuel holes of the cavity fuel injector tubes inside the cavity of the annular trapped dual vortex cavity pilot and aimed for spraying fuel circumferentially around the annular cavity.

26. An engine according to claim 25 further comprising one or more igniters disposed within the cavity of the annular trapped dual vortex cavity pilot and located axially aft of the cavity fuel injector tubes.

27. An engine according to claim 26 further comprising the one or more igniters and the cavity fuel injector tubes arranged for spraying fuel to be entrained in a vortex formed in the cavity and pass through sparks of the one or more igniters.

28. A method for operating a gas turbine engine augmentor, the method comprising:
supplying fuel to an annular trapped vortex cavity pilot having a cavity forward wall, a cavity radially outer wall, and a cavity aft wall, an annular cavity therebetween, and a cavity opening extending between the cavity forward and aft walls at a radially inner end of the cavity and open to exhaust flowpath of the augmentor;
flowing the fuel through cavity fuel injector tubes extending through the outer wall and into the cavity and injecting the fuel directly into the cavity;
producing at least one annular rotating vortex of a fuel and air mixture and igniting the fuel and air mixture within the cavity; and
injecting the fuel into the exhaust flowpath through radial spraybars and/or integral spraybars extending radially inwardly into the exhaust flowpath wherein the augmentor further includes a plurality of circumferentially spaced apart radial flameholders extending radially inwardly into the exhaust flowpath and the integral spraybars are integral with the radial flameholders and igniting the fuel from the radial spraybars and/or integral spraybars using the trapped vortex cavity pilot.

29. A method according to claim 28 further comprising the injecting the fuel directly into the cavity includes injecting the fuel circumferentially around the cavity.

\* \* \* \* \*